United States Patent Office 3,282,974
Patented Nov. 1, 1966

3,282,974
PREPARATION OF ALUMINUM TRIALKYL COMPOUNDS
Günter Bruno, Cologne-Deutz, Bruno Blaser, Dusseldorf-Urdenbach, and Hubert Schirp, Dusseldorf, Germany, assignors to Henkel & Cie. G.m.b.H., Dusseldorf-Holthausen, Germany, a corporation of Germany
No Drawing. Filed Jan. 12, 1961, Ser. No. 82,156
Claims priority, application Germany, Jan. 16, 1960, H 38,402; May 17, 1960, H 39,451
6 Claims. (Cl. 260—448)

The present invention relates to novel aluminum di-secondary alkyl hydrides. The present invention further relates to a novel process for the production of said aluminum compounds. The invention also relates to a novel process for the preparation of α-olefins starting with non-α-olefins, and a novel process for the preparation of primary alcohols from non-α-olefins. The invention also relates to a process for the isomerization of secondary alkyl aluminum compounds to primary alkyl aluminum compounds.

It is known that aluminum tri-alkyls with β-branched alkyl radicals such as aluminum tri-isobutyl or the corresponding di-alkyl aluminum hydride can be reacted with α-olefins whereby the alkyl radicals which are originally attached to the aluminum are displaced by the olefin. In this reaction the alkyl radicals are split off from the aluminum alkyl compound in the form of the corresponding olefin such as isobutylene, and are replaced by alkyl radicals which correspond to the α-olefins. Until recently, the prior art has taught that only α-olefins may react in this manner (Experientia Supplementum II, 1955, page 282, item 2; and Angewandte Chemie, volume 68, page 725, 1956).

It is an object of the invention to provide novel di-alkyl aluminum hydrides in which the alkyl radicals are branched in the α-position.

It is another object of the invention to provide a novel process for the production of di-alkyl aluminum hydrides in which the alkyl radicals are branched in the α-position.

It is a further object of the invention to provide a novel process for the production of primary alcohols from non-α-olefins.

It is a further object of the invention to provide a novel process for the preparation of α-olefins from non-α-olefins.

These and other objects and advantages of this invention will become obvious from the following detailed description.

In contrast to the prior art which carried out the reaction of aluminum-alkyl only with olefins with a double bond in the α-position, it has now been found possible by means of the process of this invention to carry out the reaction with olefins with a double bond in a position other than the α-position. The finely divided metal catalysts such as nickel, which have been used heretofore for this reaction with α-olefins, do not work in the process of the present invention.

The process of the invention comprises reacting aluminum alkyl compounds with olefins having a double bond in other than the α-position in the presence of an entraining agent, or under reduced pressure or at higher temperatures than those which have been employed for the reaction with α-olefins or any combination of the said procedures to form aluminum secondary alkyl compounds, isomerizing said secondary alkyl compounds by heating at a temperature of at least 150° C. to form aluminum primary alkyl compounds and cleaving said primary alkyl compounds by heating at elevated temperatures to form α-olefins.

The reaction between the non-α-olefins and the aluminum hydrocarbons is effected at temperatures between 100° and 220° C. and preferably between 130° and 180° C.

To carry out the first step of the process the employment of an entrainment agent is found to be particularly advantageous. An inert gas such as nitrogen or the vapor of an inert solvent which boils at the desired reaction temperature is passed through the reaction mixture to remove the α-olefins eliminated from the aluminum alkyl during the reaction. Suitable inert solvents for this reaction are aliphatic, cycloaliphatic, aromatic or aliphatic aromatic hydrocarbons, such as decahydronaphthalene, α-methyl-naphthalene, paraffins such as the paraffinic compounds of the Fischer-Tropsch synthesis, and similar compounds. However, the preferred entrainment agent is an excess of the non-α-olefin serving as the starting material rather than an inert solvent. In the event that the non-α-olefin does not boil at atmospheric pressure at the desired reaction temperature, the boiling temperature may be adjusted by applying a lesser pressure.

The vapors passing from the reaction mixture are condensed in a manner so that only the entrainment agent and not the α-olefin displaced from the starting organo-aluminum compound is recycled through the reaction mixture.

Another advantageous measure by which the splitting off of the olefin from the original organo-aluminum compound may be enhanced is the employment of reduced pressures. While it is advantageous to combine this measure with the employment of an entrainment agent, the use of reduced pressure leads to the desired result even without the use of an entrainment agent or without simultaneous boiling under reflux.

A third method of conducting the first step of the present process consists of carrying out the reaction at high temperatures lying above 150° C. In this instance the reaction is often less complete or undesirable side reactions may take place. However, the side reactions may be substantially reduced by the addition of suitable diluting or stabilizing agents. For this purpose, olefins, particularly the non-α-olefins serving as the starting materials, are preferably used. The excess olefin may be easily recovered by distillation or other means. In general, however, it is preferred to work in the presence of an entrainment agent and/or under reduced pressure even if high temperatures above 150° C. are applied.

The aluminum-alkyl starting compounds for this reaction have the general formula $Al(CH_2—CHR_5R_6)_3$ or $H—Al—(CH_2—CHR_5—R_6)_2$, wherein $R_5$ and $R_6$ may be hydrogen or lower alkyl radicals. Examples of such compounds are aluminum tri-ethyl, aluminum tri-n-propyl, aluminum tri-n-butyl, aluminum tri-hexyl, or the corresponding aluminum di-alkyl hydrides. Preferred starting compounds, however, are those wherein $R_5$ and $R_6$ represent hydrocarbon radicals or when taken together form a hydrocarbon ring. Examples of such compounds are aluminum tri-isobutyl, aluminum di-isobutyl hydride or aluminum hydrocarbons of analogous structure, which have been produced by using 2-methyl-pentene-1, 2-ethyl-hexene-1, or cyclic compounds such as limonene.

The use of aluminum hydrocarbon compounds in which the alkyl radicals do not contain more than eight, preferably not more than six, carbon atoms are particularly advantageous as the olefins split off by the reaction are readily volatile and are easily removed during the reaction. For this reason and because of the relative cheapness of the materials, aluminum tri-isobutyl and aluminum di-isobutyl hydride are particularly suitable for commercial use.

The non-α-olefins used in the first step of the process have the formula

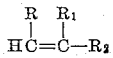

wherein R and $R_1$ are the same or different alkyl radicals, and $R_2$ is selected from the group consisting of hydrogen and alkyl radicals, and the sum of the carbon atoms of R, $R_1$ and $R_2$ is between 4 and 28. Examples of suitable starting materials are hexene-3, heptene-3, octene-4, nonene-4, decene-5, dodecene-3, dodecene-4, dodecene-6, hexadecene-6, hexadecene-7, octadecene-9, eicosene-10. The preferred olefins are those in which $R_2$ is hydrogen and at least one of the radicals R and $R_1$ is a straight chain radical due to the isomerization reaction following. The amount of olefin in the reaction is advantageously 2 to 20 mols, preferably about 4 to 6 mols, per mol of the aluminum alkyl compound.

The starting olefins may be pure or they may be a mixture of olefins or may be a mixture of olefins with saturated hydrocarbons, or mixed with α-olefins. These mixtures may be obtained, for example, by the Fischer-Tropsch synthesis or by catalytic cracking of petroleum, and if desired may be divided into fractions of certain chain lengths.

If α-olefins are present in the mixture, it is desirable to react the α-olefins with a part of the aluminum alkyl according to known procedures and then to subsequently distill off the unreacted hydrocarbon mixture, and react the non-α-olefin with aluminum alkyl in accordance with the process of this invention. The saturated paraffin hydrocarbons in the starting material will not interfere with the reaction according to the present invention.

The di-secondary alkyl aluminum hydrides produced in the first step of the process have the formula

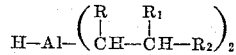

wherein R, $R_1$ and $R_2$ have the above definitions and are transformed into alkyl aluminum compounds with primary alkyl radicals by heating in the presence of olefins. In addition to the rearrangement of the secondary alkyl radicals into primary alkyl radicals, a complete or very substantial addition of another alkyl radical takes place, so that the reaction products consist entirely or to a large part of trialkyl aluminum compounds and contain only minor amounts of aluminum-H-bonds. The third alkyl radical is present entirely or partially in primary form, depending upon the prevailing temperature and the duration of the heating step.

This reaction takes place at a temperature between 150 and 250° C., preferably at a temperature between 180 and 220° C. The duration of the heating step depends upon the temperature and the structure of the reactants and may vary between a few minutes and several hours.

The olefin is preferably the same olefin with a non-α-bond which is used as the starting material for the first process step. This olefin does not undergo any undesirable changes under the prevailing conditions, so that the excess may readily be recovered.

It is also possible to use an α-olefin as the olefin. In this case a dimerization of the olefin often takes place, so that the third alkyl radical which is added to the aluminum compound entirely or partly contains twice the number of carbon atoms as the α-olefin starting material.

The olefin which simultaneously serves as a stabilizing agent in this step is, therefore, advantageously employed in excess above the amount required for formation of the third alkyl radical, that is in an amount of more than one mol per mol of the di-secondary alkyl aluminum hydride. While there is no upper limit for the amount of olefin present as stabilizer, it is recommended to use no more than 20 mols of olefin per mol of di-secondary alkyl aluminum hydride for convenience and economy.

In place of the di-secondary alkyl aluminum hydrides it is also possible to use as starting materials for the second process step those compounds which are obtained by reaction of the di-secondary alkyl aluminum hydrides with an α-olefin at temperatures below 150° C. In this manner trialkyl aluminum compounds are formed in which two alkyl radicals are secondary and the third alkyl radical is primary. These aluminum trialkyl compounds have the formula

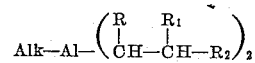

In this formula R, $R_1$ and $R_2$ have the above indicated definitions and Alk is a primary alkyl radical with 2 to 30 carbon atoms.

If the reaction product of the second step still contains Al-H-bonds it is possible to react these Al-H-bonds with an α-olefin and in this manner to obtain a reaction product which consists exclusively of trialkyl aluminum compounds. The subsequent reaction of Al-H-bonds which may be present with an α-olefin is especially advantageous if it is desired to obtain high molecular alcohols from the trialkyl aluminum compound by oxidation and subsequent hydrolysis. In this case the Al-H-bonds which are still present give rise to side reactions and thereby reduce the yield of alcohol.

The first and second steps of this process, namely, the displacement reaction and the isomerization reaction, may be done in one operation, and the di-secondary alkyl aluminum hydrides need not be separated first.

The novel di-secondary alkyl aluminum hydrides have not been previously described in the literature.

Isomerization reactions have heretofore been described only with short chain aluminum alkyls, namely, aluminum tri-isopropyl, and aluminum tri-secondary butyl. These compounds were rearranged into the corresponding n-alkyl compounds by heating for 30 hours at a temperature between 110° and 130° C. However, partial splitting off of the alkyl radicals took place and side reactions occurred. Even by raising the reaction conditions, good results could not be obtained. Therefore, it is surprising that the rearrangement of applicants' di-secondary alkyl aluminum hydrides may be easily and with quantitative yields isomerized to straight chain alkyl compounds.

The aluminum primary-alkyl compounds produced by the second step, are cleaved in the third step of the process at elevated temperatures and under conditions such that the olefin split off thereby is rapidly removed from the reaction mixture. For this purpose it is possible to employ reduced pressures and/or an entraining agent. The selection of the reduced pressure depends generally upon the boiling point of the olefin formed by the reaction. For example, the decomposition of aluminum n-octyl is advantageously performed under a vacuum of about 10 to 20 mm. mercury at 150° to 220° C. For the pyrolysis of aluminum tri-n-dodecyl it is advantageous to use a vacuum of about 1 mm. mercury and a temperature of 150° to 220° C. With increasing chain length of the alkyl radicals, it is advantageous to perform the decomposition in a thin layer evaporator. Thus, it is possible to decompose aluminum tri-n-octadecyl in such a thin layer evaporator at about 150 to 300° C. and a pressure of about $10^{-2}$ mm. mercury and to obtain virtually pure α-octadecene thereby. The same method may be used in the case of organo-aluminum compounds with still longer alkyl radicals containing up to about 30 carbon atoms.

An inert gas, such as nitrogen, argon or hydrogen, may be used as the entraining agent. This gas is heated to the decomposition temperature and passed through the organo-aluminum compound at a sufficiently high rate of flow to insure the rapid removal of the olefin. It may also be advantageous to use the vapor of an inert solvent, such as a hydrocarbon, as the entraining agent. The solvent should have a boiling point of about 170 to 220° C. at the pressure selected for the pyrolysis.

It is possible, and in some instances advantageous, to perform the cleavage in two steps. In the first step 1 mol of olefin is split off under mild conditions and a dialkyl aluminum hydride is formed. The latter is decomposed in the second step at elevated temperature into aluminum hydride and olefin. Since the isomerization of the third alkyl group in the first step of the cleavage is in some instances not quite complete, the olefin distillate of the first cleavage contains certain amounts of olefins with a non-terminal double bond, whereas the olefin distillate in the second step consists practically of pure α-olefin.

It has further been found that the pyrolysis of the organo-aluminum compound may be enhanced by addition of small amounts of aluminum powder or finely granulated aluminum. The decomposition of the aluminum hydrocarbons is thereby accelerated and undesirable side reactions are suppressed. It suffices to add quantities of less than 1%, such as 0.2 to 0.5%, of aluminum powder to the organo-aluminum compound, although larger amounts may be used.

The α-olefins produced in accordance with the process of the invention are of high purity. They may be employed for those various purposes for which α-olefins have previously also been employed. For example, by polymerization they yield excellent lubricating oils which exhibit a considerably higher viscosity index than the products produced by polymerization of olefins having a double bond in other than the terminal position.

Despite the strong isomerizing effect of finely divided aluminum or aluminum hydrocarbons, it is surprising that it is possible to produce substantially pure α-olefins, more than 95% α-olefins. In other processes for the production of pure α-olefins, mixtures containing 2 to 6% of other isomers are obtained and is even higher in some industrial processes.

The aluminum primary-alkyl compounds produced by the isomerization may be readily converted into products such as primary long chain alcohol, carboxylic acids or alkyl sulfonic acids, for example, the primary alkyl compounds may be oxidized to form the aluminum alcoholate which then may be hydrolyzed to produce the free alcohol. By using the process of the present invention, olefin mixtures obtained from the Fischer-Tropsch synthesis or catalytic cracking of petroleum can now be converted into valuable products whereas previously only the α-olefin could be utilized.

In the following examples there are described several preferred embodiments to illustrate the invention. However, it should be understood that the invention is not intended to be limited to the specific embodiments.

Example I

The test described below was carried out in a 2-liter 3-neck flask which was provided with a magnetic stirrer, an internal thermometer and a reflux cooler made of copper. The reflux cooler was connected to a bubble counter, a condenser cooled with liquid air and a nitrogen intake valve.

In the 3-neck flask 226.6 gm. of aluminum trisobutyl and 598 gm. of dodecene-6 (boiling point=99° C. at 18 mm. Hg, $n_D^{20}$=1.4328) were admixed with each other. The mixture was heated, accompanied by vigorous stirring, and under a pressure of 47 mm. Hg, from 100 to about 140° C. internal temperature over a course of six hours according to the development of isobutylene. At the final temperature, the dodecene-6 boiled under reflux. At the end of the run, 178.4 gm. of isobutylene had condensed in the liquid-air cooled condenser trap.

The colorless reaction mixture which weighed 645.0 gm. was transferred into a distillation apparatus under an atmosphere of nitrogen. Subsequently, the excess dodecene was distilled off under a high vacuum at a bath temperature up to 65° C. with a short increase to 100° C. 2.11 gm. of pure dodecene-6 were obtained as the distillate, the infra-red spectrum of which corresponded with the starting olefin. 430.0 gm. of a colorless, highly viscous liquid remained as residue which consisted of practically pure di-secondary dodecyl aluminum hydride. A sample of this compound yielded, upon hydrolysis, 98.6% of the calculated amount of hydrogen. The aluminum content amounted to 7.02% (calculated 7.13%).

To form aluminum heptane di-secondary dodecyl compound, 106.8 gm. of this product were heated together with 29.4 gm. of heptene-1 to a temperature of 65° C. (internal temperature) for 12 hours, accompanied by stirring. Subsequently, the reaction mixture was diluted with 300 cc. of dry heptene and was then oxidized by introduction of air accompanied by stirring and cooling. The aluminum alcoholate formed thereby was hydrolyzed by addition of the calculated amount of dilute sulfuric acid. After separation of the aqueous phase, the heptene solution was dried with magnesium sulfate and the heptene was distilled off in vacuo. The residue was subjected to fractional distillation in vacuo (15 mm. Hg) in a 1-meter packed column. The following fractions were obtained:

9.1 gm. of heptanol-1 (B.P.=81° C. at 15 mm. Hg, $n_D^{20}$=1.4238)

27.8 gm. of dry dodecanol (B.P.=132–135° C. at 15 mm. Hg, $n_D^{20}$=1.4394)

The dodecanol consisted of at least two different isomers.

Example II

For the isomerization step, 71.7 gm. of the aluminum di-secondary dodecyl hydride prepared according to Example I were heated together with 67.3 gm. of dodecene-6 and 100 cc. of dry decahydronaphthalene in a 500 cc. 2-neck flask for 30 hours at 170° C. (internal temperature) under reflux accompanied by stirring with a magnetic stirring device. Then, without isolating the organo-aluminum compound formed, the reaction mixture was oxidized by introducing oxygen. Thereafter, the volatile components were distilled off under a high vacuum up to an internal temperature of 100° C. The residue (95.3 gm.) consisting of aluminum alcoholate was hydrolyzed with dilute sulfuric acid. The alcohol which separated out was extracted with ether. The ethereal solution was dried. The residue remaining after distilling off the ether was fractionally distilled in vacuo (15 mm. Hg) in a 1-meter packed column. 73.5 gm. of dodecanol-1 (boiling point=146.5° C. at 15 mm. Hg; M.P.=24° C.; $n_D^{25}$=1.4410) were obtained as the principal fraction.

Example III 64.7 gm. of aluminum tri-isobutyl and 205.8 gm. of nonene-4 (boiling point=148° C., $n_D^{20}$=1.4195, according to infra-red analysis practically free from α-olefins) were heated in a 750 cc. 2-neck flask for 24 hours under reflux (about 160° C. internal temperature) accompanied by stirring with a magnetic stirring device. At the end of this time, 51 gm. of isobutylene had condensed in the trap which was connected to the reflux cooler in similar fashion as in Example I and which was cooled to −70° C. After the reaction mixture had cooled, it was oxidized by introduction of air without isolation of the aluminum alkyl compound formed during the refluxing. Subsequently, the excess nonene-4 was distilled off from the aluminum alcoholate in a high vacuum at an internal temperature of up to 90° C. A distillate was obtained thereby which consisted of 90 gm. of nonene-4 whose refractive index and infra-red spectrum corresponded to those of the starting olefin. The aluminum alcoholate which weighed 128 gm. was hydrolyzed with the calculated amount of dilute sulfuric acid. The alcohol formed thereby was extracted with ether, the ether solution was dried with magnesium sulfate and the ether was distilled off. The residue obtained thereby was fractionally distilled in a 1-meter packed column under a vacuum of 50 mm. Hg. 99.5 gm. of nonanol-1 (boiling point=132.5° C. at 50 mm. Hg; $n_D^{20}$=1.4338) were obtained.

This example illustrates the simultaneous alkylation and isomerization of the di-secondary alkyl aluminum hydride.

Example IV 208 gm. aluminum tri-isobutyl and 588 gm. of nonene-4 were heated in a 2-liter, 2-neck flask provided with a reflux cooler and a magnetic stirrer to an internal temperature of 155° C. in the course of about 4 hours, accompanied by stirring. The reflux cooler was connected to a bubble counter and to a trap which was cooled to −70° C. At 155° C. internal temperature the nonene-4 began to reflux, while prior thereto a vigorous evolution of gas was observed. Thereafter, the reaction mixture was heated for 12 hours under reflux. After cooling, the mixture was admixed with 800 cc. dry decahydronaphthalene and the mixture was again heated at an internal temperature of 160 to 165° C. for 10 hours. At the end of this time a total of 160 gm. isobutylene had condensed in the trap.

The excess nonene as well as the decahydronaphthalene were then distilled off in a vacuum of about 0.1 mm. and at a bath temperature up to 100° C. The residue had an aluminum content of 6.9% and weighed 410 gm. Upon being admixed with n-propanol, the residue yielded only a small amount of hydrogen and isobutane.

392 gm. of this product were heated in a distillation apparatus under a vacuum of about 1 mm. mercury in the course of 3 hours to 140–180° C. bath temperature, accompanied by stirring with a magnetic stirrer. In order to avoid losses, the distillate trap was cooled to −70° C. Thereafter, the distillate trap, in which 92 gm. of nonene had collected, was exchanged. By infra-red analysis, it was determined that the α-olefin content of this first fraction was 62%. The colorless, clear di-n-nonyl aluminum hydride in the distillation flask was then heated in a vacuum to a bath temperature of 180 to 240° C. The pressure in the distillation apparatus initially was 1 mm. mercury, but in the course of the cleavage reaction it temporarily rose to 10 mm. mercury because of the evolution of hydrogen. The reaction was completed after 8 hours. The distillate thus obtained (second fraction) weighed 243 gm. and, upon infra-red analysis, had an α-olefin content of 97%. About 25 gm. of aluminum remained as the residue in the flask.

Example V 103 gm. aluminum tri-isobutyl and 418 gm. of dodecene-6 were heated gradually (depending upon the evolution of isobutylene) in a 1-liter, 2-neck flask provided with a reflux cooler in the course of 6 hours at a pressure of about 80 mm. mercury to an internal temperature of 145° C., accompanied by stirring with a magnetic stirrer. The reflux cooler was connected to a bubble counter and a cooled distillate trap. After 6 hours 85.5 gm. of isobutylene (99% of theory) had collected in the trap which was cooled with liquid air.

The reaction product was then admixed with 400 cc. dry decahydronaphthalene and the mixture was heated to 170° C. internal temperature for 32 hours, accompanied by stirring with a magnetic stirrer. Thereafter, the solvent and the excess dodecene were distilled off under a vacuum of $10^{-2}$ mm. mercury and at a bath temperature up to 100° C. The residue, which weighed 270 gm., was subjected to thermal cleavage under a vacuum of 1 mm. mercury in a distillation apparatus. The cleavage was carried out in two steps. In the first step the bath temperature was increased up to 170° C. The distillate consisted of 45 gm. dodecene having a content of α-olefin of 57%. In the second step the bath temperature was increased up to 250° C. 190 gm. dodecene with an α-olefin content of 97% were obtained as the distillate.

Example VI

A mixture of 784 gm. of aluminum tri-isobutyl and 2427 gm. of tridecene-6 ($n_D^{20}$=1.4352; I number=137; boiling point at 13 mm. Hg=109° C.; the infra-red analysis showed that it was practically pure olefin with a non-terminal double bond which was present almost exclusively in the trans form) was heated under reflux for 15 hours at an internal temperature which was gradually increased from 130 to 150° C., accompanied by stirring with a magnetic stirring device, in the same apparatus as that described in Example I, except that a 4-liter flask was used. During the reaction the pressure was gradually decreased from 50 mm. Hg to 14 mm. Hg. After termination of the heating period, 657 gm. of isobutylene (99% of theory) had condensed in the cooled trap.

The excess tridecene-6 was distilled out of the colorless reaction mixture in a high vacuum ($10^{-4}$ mm. Hg) at a bath temperature up to 100° C. 1005 gm. of pure tridecene-6, whose analytical data corresponded with that of the starting olefin, were obtained as the distillate. 1540 gm. of a colorless, highly viscous liquid, which consisted of practically pure, di-(secondary tridecyl)-aluminum hydride remained as the residue. Upon hydrolysis, a sample of this compnud yielded the theoretical amount of hydrogen. The aluminum content was 6.9% (calculated 6.8%).

136.5 gm. of this product were heated together with 56 gm. of decene-1 ($n_D^{20}$=1.4216) for 12 hours at 70° C. (internal temperature) accompanied by stirring with a magnetic stirring device. Thereafter, the reaction mixture was diluted with 2 liters of hexane and oxidized by introducing oxygen while stirring and cooling. At the end of the oxidation the mixture was maintained for 20 minutes at 40° C. while passing oxygen therethrough. Subsequently, the hexane was distilled off at a pressure of 12 mm. Hg and an internal temperature of up to 50° C. The residue, which weighed 215 gm., was taken up in ether and was hydrolyzed with the calculated amount of dilute sulfuric acid. The mixture thus obtained was extracted three times with ether. The combined ether extract solutions were dried with anhydrous magnesium sulfate. After distilling off the ether a residue of 194 gm. remained behind which was fractionated with the aid of a one-meter rotary band column at a pressure of 12 mm. Hg. The following principal fractions were obtained:

44 gm. of decanol-1—B.P. at 12 mm. Hg=119.8° C.; $n_D^{20}$=1.4370, OH number=350 (calculated 354)

36 gm. of tridecanone—B.P. at 13 mm. Hg=136.5° C.; $n_D^{20}$=1.4345; carbonyl number=271 (calculated 284)

60 gm. secondary-tridecanol—B.P. at 13 mm. Hg=142–145° C.; $n_D^{20}$=1.4412, OH number=273 (calculated 280)

The tridecanone as well as the secondary-tridecanol were, in addition, identified by infra-red analysis.

Example VII

A mixture of 80.6 gm. of di-(secondary-tridecyl)-aluminium hydride and 125 gm. tridecene-6 was heated for 32 hours at an internal temperature of 170° C., accompanied by stirring with a magnetic stirring device, in the same apparatus as that described in Example II. Thereafter, the excess tridecene was distilled off in a high vacuum ($10^{-4}$ mm. Hg) at a bath temperature of up to 100° C. 86 gm. of tridecene-6 were obtained as the distilliate. The analytical data agreed with those of the starting olefin. The residue, which had a weight of 118 gm., was heated to an internal temperature of 70° C., accompanied by stirring with a magnetic stirring device. For the purpose of saturating any Al-H-bonds which might be present, a slow stream of ethylene was passed through the liquid for about one hour. Thereafter, the product was diluted with 1:5 liters of hexane and was oxidized with oxygen, accompanied by stirring and cooling. Subsequently, the solvent was distilled off at a pressure of 14 mm. Hg and a bath temperature up to 50° C. The residue, which weighed 131 gm., was hydrolyzed and worked up in the customary fashion. 124 gm. of raw alcohol were obtained which were fractionally distilled at a pressure of 12 mm. Hg with the aid of a 1-meter rotary band column. A principal fraction of 76 gm. tridecanol-1 were obtained thereby which had the following characteristic values:

B.P. at 12 mm. Hg=156° C., $n_D^{20}$=1.4377, M.P.=29° C., OH number=280 (calculated 280)

In accordance with infra-red analysis this fraction consisted of pure primary alcohol. A non-distillable residue weighing 31 gm. remained behind.

This same run was repeated several times, except that the reaction temperature and the period of heating were varied. The results obtained thereby are shown in the following table:

| Reaction Temperature | Reaction Time | Yield, gm. of tridecanol-1 |
| --- | --- | --- |
| 180° C | 20 hours | 75.0 |
| 190° C | 5 hours | 77.5 |
| 220° C | 1 hour | 78.0 |
| 240° C | 20 minutes | 63.5 |

Note: Upon exceeding a reaction temperature of 230° C., a decomposition of the organo-aluminum compound takes place to an ever-increasing degree, accompanied by separation of metallic aluminum and evolution of hydrogen. For this reason no statisfactory results are obtained above 250° C.

*Example VIII*

A mixture of 240.5 gm. of aluminum di-isobutyl hydride and 950 gm. of a mixture of straight-chain decenes with non-terminal double bonds ($n_D^{20}$=1.4273; iodine number=180; according to infra-red analysis practically 100% decene with non-terminal double bonds) was heated at atmospheric pressure for 7 hours under reflux and accompanied by stirring with a magnetic stirring device, in the same apparatus as that described in Example I, except that a 4-liter flask was used. The internal temperature rose from 170 to about 190° C. Upon termination of the heating period 185 gm. of isobutylene (97% of theory) had condensed in the cooled trap.

149.2 gm. of the reaction mixture thus obtained were withdrawn, and the excess olefin was distilled therefrom in a high vacuum ($10^{-4}$ mm. Hg) up to a bath temperature of 90° C. 44 gm. of decene were obtained thereby as a distillate. The analytical data of this distillate agreed with those of the starting olefin. The residue, which weighed 102 gm., was heated with 10 gm. of heptene-1 for 12 hours at 70° C., accompanied by stirring with a magnetic stirring device. Thereafter, the mixture was diluted with 1.5 liters of heptane and was then oxidized, hydrolyzed and worked up in the usual manner. 112 gm. of an alcohol mixture were obtained which was fractionated with the aid of a one-meter rotary band column at a pressure of 12 mm. Hg. The following principal fractions were obtained:

85 gm. of heptanol-1 having a boiling point at 15 mm. Hg=83.5° C., $n_D^{20}$=1.4240,
75 gm. of decanol-1 having a boiling point at 12 mm. Hg=119.5° C., $n_D^{20}$=1.4370.

The excess decene was distilled off in a high vacuum ($10^{-4}$ mm. Hg) at a bath temperature up to 100° C. from another 332 gm. portion of the mixture obtained in the first reaction step. 102 gm. of distillate were obtained. The residue was subjected to thermal cleavage in two steps.

In the first step the bath temperature was increased from 100 to 150° C. under a vacuum of $10^{-4}$ mm. Hg. 41 gm. of distillate were obtained which had an iodine number of 178. Infra-red analysis showed that it was a mixture of α-decene and decene with non-terminal double bond in a ratio of about 1:1.

In the second step the bath temperature was increased from 150 to 200° C. at a pressure of $10^{-4}$ mm. Hg. As a result of the evolution of hydrogen, the pressure temporarily rose to 1 mm. Hg. 167 gm. of distillate were obtained. This distillate was again distilled and, thereafter, weighed 147 gm. and had the following characteristic values: $n_D^{20}$=1.4217, iodine number=180. Infra-red analysis showed that it was practically pure decene-1 containing only about 2% of decene with non-terminal double bond.

The same run was repeated, only 2 gm. of aluminum powder were added as a catalyst. Practically the same yields were obtained. However, it was found that the cleavage was complete at a temperature as low as 170 to 180° C.

*Example IX*

A mixture of 148 gm. of aluminum tri-2-ethylhexyl and 492 gm. of eicosene-10 ($n_D^{20}$=1.4490; hydrogenation iodine number=77 (calculated 77); boiling point at 1.5 mm. Hg=151° C.) were heated under reflux at 110 to 135° C. (internal temperature) accompanied by stirring with a magnetic stirring device in the same apparatus as described in Example 1 for 4½ hours under a pressure of 0.01 to 0.05 mm. Hg. 119 gm. of 2-ethylhexene-1 ($n_D^{20}$=1.4153) collected in the condenser.

The reaction product weighed 521 gm.; 271 gm. of this product were heated for 105 minutes at 220° C. accompanied by stirring with a magnetic stirring device. After cooling, 20 gm. decene-1 were added to the product for the purpose of saturaitng any Al-H-bonds which might still be present. Thereafter, the mixture was heated for 12 hours at 70° C. accompanied by stirring with a magnetic stirring device. The product thus obtained was dissolved in 1.2 liters of hexane and was oxidized with oxygen in the usual manner, the solution being heated for 30 minutes at 50° C. at the end of the oxidation procedure. Thereafter, the solvent was removed first at a vacuum of 12 mm. Hg and a bath temperature up to 60° C.; then, the excess olefin was distilled off at a pressure of $10^{-4}$ mm. Hg and at a bath temperature up to 150° C. 154 gm. of distillate were obtained. The residue, which weighed 136 gm., was hydrolyzed in the usual manner with dilute sulfuric acid. Upon working up the hydrolyzation mixture 129 gm. of a raw alcohol were obtained which was solid at room temperature. This alcohol was fractionated with the aid of a 1-meter rotary band column, first in a vacuum of 12 mm. Hg and then in a vacuum of 0.1 mm. Hg. The following principal fractions were obtained:

15 gm. decanol-1 having a boiling point at 12 mm. Hg=119.5° C., $n_D^{20}$=1.4370,
89 gm. eicosanol-1 having a boiling point at 0.4 mm. Hg=181° C., M.P. =64–65° C., OH number=186 (calculated 188).

*Example X*

A mixture of 77 gm. of aluminum triisobutyl and 1345 gm. of the $C_{14}$ fraction of a hydrocarbon obtained by Fischer-Tropsch synthesis was heated, accompanied by stirring with a magnetic stirring device, for 7 hours in a vacuum of 12 mm. Hg and at a temperature which was gradually increased from 100 to 110° C. in the same apparatus as described in Example 1, except that a 4-liter flask was used. The Fischer-Tropsch hydrocarbon had the following characteristic values: boiling point at 12.5 mm. Hg=125 to 126° C., hydrogenation iodine number=62 (calculated for tetradecene=129). Infra-red analysis showed a content of 17% α-olefin and 30% trans-olefin with non-terminal double bond as well as small amounts of branded and cis-olefins.

After termination of the heating period 62 gm. of isobutylene (95% of theory) had collected in the cooled trap. Thereafter, all of the volatile components were distilled off under a vacuum of $10^{-4}$ mm. Hg at a bath temperature of up to 100° C., accompanied by stirring with magnetic stirring device. 1123 gm. of distillate were obtained which, according to infra-red analysis, contained about 35% trans-tetradecene with non-terminal double bond and only about 1% tetradecene-1. The residue weighed 233 gm. 105 gm. of this residue were dissolved in 1.2 liters of heptane and were oxidized with oxygen and worked up in the usual manner. 111 gm. of a solid crystalline raw alcohol were obtained, which was fractionated with the aid of a 1-meter rotary band column under a vacuum of 12 mm. Hg. A principal fraction of 85 gm. of tetradecanol-1 were obtained which had the following characteristic values:

B.P. at 12 mm. Hg=167° C., M.P. 36–37° C., $n_D^{45}$=1.4380,
OH number=260 (calculated 262).

1117 gm. of the distillate obtained in the above run, which contained 35% tetradecene with non-terminal double bond, and 103 gm. aluminum triisobutyl were refluxed for 4½ hours at a pressure of 11 mm. Hg and a temperature of 127° C., accompanied by stirring with a magnetic stirring device. The same apparatus as that described in Example 1 was used for this purpose. 85 gm. of isobutylene (97% of theory) collected in the cooled condenser. The total weight of the reaction solution was 1124 gm.; 557 gm. of this solution were heated for 75 minutes at 220° C., accompanied by magnetic stirring. A slight discoloration occured due to the separation of colloidal aluminum. The solution was cooled to 70° C. At this temperature ethylene was introduced for one hour in order to saturate any Al-H-bonds which might be present. Thereafter, the mixture was oxidized with oxygen in the usual manner, accompanied by stirring and cooling, and at the end of the oxidation the reaction mixture was heated for 30 minutes to 50° C. The hydrocarbon was distilled from the alumium alcoholate thus obtained in a high vacuum ($10^{-4}$ mm. Hg) at a bath temperature up to 130° C. The residue, which weighed 143 gm., was hydrolyzed with dilute sulfuric acid and worked up in the usual manner. 131 gm. of a solid crystalline raw alcohol were obtained. This raw alcohol was fractionated with the aid of a 1-meter rotary band column at a pressure of 12 mm. Hg. 105 gm. of tetradecanol-1 were obtained as the principal fraction. The alcohol had the following characteristic values:

B.P. at 12 mm. Hg=167° C., M.P.=36–37° C., $n_D^{45}$=1.4378,
Hydroxyl number=259 (calculated 261).

Example XI

A mixture of 64 gm. of aluminum diisobutyl hydride and 393 gm. of 6-n-amylundecene-5 (boiling point at 14 mm. Hg=141° C.; $n_D^{20}$=1.4455; identified by infra-red spectroscopy) was refluxed for 12 hours at a pressure of 13 mm. Hg and at an internal temperature of about 142° C. in the same apparatus as that described in Example 1, except that a one-liter flask was used. 30 gm. of isobutylene collected in the cooled condenser. The unreacted olefin was distilled from the reaction solution which weighed 427 gm. under a pressure of $10^{-4}$ mm. Hg and a bath temperature of up to 100° C. 289 gm. of distillate were obtained, whose characteristic values corresponded with those of the starting olefin. The residue weighed 136 gm. 60 gm. of this residue were heated for 12 hours at 70° C. with 33 gm. of heptene-1, accompanied by magnetic stirring. Thereafter, the reaction mixture was diluted with 1.3 liters of hexane and was oxidized with oxygen and worked up in the usual manner. 87 gm. of a raw alcohol were obtained which were fractionated with the aid of a 1-meter rotary band column at a pressure of 12 mm. Hg. The following principal fractions were obtained:

27 gm. of heptanol-1 having a boiling point at 12 mm. Hg=78° C.; $n_D^{20}$=1.4238
20 gm. of 6-n-amylundecene-5; B.P. 12 mm. Hg=137° C., $n_D^{20}$=1.4450;
Infra-red spectrum corresponds with the starting olefin—
24 gm. of a mixture of a secondary branched $C_{16}$-alcohol and a branched $C_{16}$-ketone (infra-red spectroscopically identified), B.P. at 12 mm. Hg=161–164° C.; $n_D^{20}$=1.4461; hydroxyl-number 175; carbonyl number 59

68 gm. of the aluminum compound obtained in the first step, together with 288 gm. of 6-n-amyl-undecene-5, were heated for three hours at 200° C., accompanied by magnetic stirring. Thereafter, the excess olefin was distilled off in a high vacuum ($10^{-4}$ mm. Hg) at a bath temperature up to 100° C. 259 gm. of distillate were obtained whose characteristic values corresponded with those of the starting olefin. The residue weighed 92 gm. The residue was heated with 10 gm. of heptene-1 for 12 hours at 70° C., accompanied by magnetic stirring. The mixture was diluted with 1.3 liters of hexane and was oxidized and worked up in the usual manner. 102 gm. of raw alcohol were obtained which were fractionated with the aid of a 1-meter rotary band column at a pressure of 12 mm. Hg. The following principal fraction was obtained:

68 gm. of 6-n-amylundecanol-1 having a boiling point at 12 mm. Hg=176.3° C.
$n_D^{20}$=1.4500; hydroxyl number=228 (calculated 231).

Example XII 110 gm. of aluminum diisobutyl hydride and 783 gm. of a mixture of 2-methyl-7-ethyl-nonene-3 and 2-methyl-7-ethyl-nonene-4 ($n_D^{20}$=1.4328; iodine number=150 (calculated 150); practically pure trans-olefin with non-terminal double bond, according to infra-red analysis) were refluxed at a slowly increasing temperature of 130 to 160° C. for 5 hours, accompanied by magnetic stirring, in the same apparatus as that described in Example 1. The pressure was varied according to requirements between 90 and 160 mm. Hg, so that the mixture always boiled under reflux. 67 gm. of isobutylene collected in the cooled condenser. The reaction mixture weighed 826 gm. The olefin was distilled out of this reaction mixture in a high vacuum ($10^{-4}$ mm. Hg) at a bath temperature of up to 60° C. 582 gm. of distillate were obtained, which was identical with the starting olefin. The residue weighed 240 gm. 111 gm. of this residue were heated with 52 gm. of heptene-1 for 15 hours at 70° C. accompanied by magnetic stirring. Thereafter, the product was diluted with 1.2 liters of hexane and was oxidized and worked up in the usual manner. 151 gm. of raw alcohol were obtained, which was fractionated with the aid of a 1 meter rotary band column at a pressure of 12 mm. Hg. The following fractions were obtained:

32.5 gm. of heptanol-1
31 gm. of 2-methyl-7-ethyl-nonene-3 and -4

*Note:* A portion of the heptanol passed over together with the olefin in the form of an azeotropic mixture.

15 gm. of a $C_{12}$-ketone having a boiling point at 12 mm. Hg=102–106° C.;
$n_D^{20}$=1.4325; carbonyl number=289 (calculated 304);
32 gm. of a secondary $C_{12}$-alcohol having a boiling point at 12 mm. Hg=111–113° C.;
$n_D^{20}$=1.4403; hydroxyl number=295 (calculated 301).

The infra-red spectrum of this alcohol corresponded to the infra-red spectrum of 2-methyl-7-ethyl-nonanol-4; from which the starting olefin was prepared.

Example XIII 35 gm. of aluminum-tri-n-propyl and 295 gm. of heptacosene-13 (M.P.=40° C.; $n_D^{50}$=1.442; iodine number=66; pure non-terminal olefin, as determined by infra-red analysis) were refluxed for 6 hours at a pressure of 0.02 mm. Hg in a 750 cc. flask, accompanied by magnetic stirring, the temperature of the reaction mixture being about 155° C. Upon termination of the heating, 27 gm. of propylene had condensed in the cooled trap. The reaction product thus obtained was heated for 8 more hours at 200° C. and atmospheric pressure, accompanied by magnetic stirring. Thereafter, the reaction product was dissolved in 1500 cc. of anhydrous xylene. Ethylene was introduced into this solution for about one hour at 70° C. accompanied by stirring. Subsequently, the xylene solution was oxidized with oxygen and hydrolyzed in the usual manner. The xylene was then distilled off at a pressure of 12 mm. Hg up to a sump temperature of 150° C. The residue obtained thereby was recrystallized from 700 cc. of chloroform. 102 gm. of heptacosanol-1 were obtained. The product had the following characteristic values:

Melting point: 76–78° C.
OH number: 135
Infra-red analysis showed that it was practically pure primary alcohol.

Various modifications of the process and the products of the invention may be made without departing from the spirit or scope thereof, and it is to be understood that the invention is limited only as defined in the appended claims.

We claim:
1. A process for the production of trialkyl aluminum compounds wherein the alkyl radicals are predominantly primary alkyl radicals and have 6 to 30 carbon atoms per alkyl radical which comprises reacting an olefin having the formula

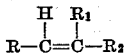

wherein R and R$_1$ are alkyl radicals and R$_2$ is selected from the group consisting of hydrogen and an alkyl radical and the sum of the carbon atoms in R, R$_1$ and R$_2$ is between 4 and 28 with an aluminum alkyl having a formula selected from the group consisting of

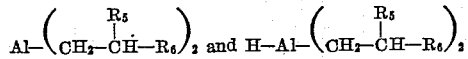

wherein each of R$_5$ and R$_6$ represents a member selected from the group consisting of hydrogen and alkyl radicals and wherein R$_5$ and R$_6$ together with the

to which they are connected may also represent a cycloalkyl radical, the sum of the carbon atoms in R$_5$ and R$_6$ being between 0 and 6 at temperatures between 100 and 150° C. while removing olefins having the formula

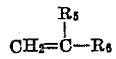

wherein R$_5$ and R$_6$ have the above definitions to form an aluminum hydride of the formula

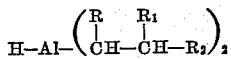

wherein R, R$_1$ and R$_2$ have the above definitions, isomerizing the said hydride by heating at temperatures between 150 and 250° C. in the presence of more than equimolar amounts of an olefin having 6 to 30 carbon atoms to form trialkyl aluminum compounds wherein the alkyl radicals are predominantly primary alkyl radicals with 6 to 30 carbon atoms per alkyl radical and recovering the said trialkyl aluminum compounds.

2. The process of clim 1 wherein the starting aluminum alkyl is aluminum tri-isobutyl.

3. The process of claim 1 wherein R$_2$ is hydrogen.

4. A process for the production of aluminum tri-primary alkyl compounds having the formula

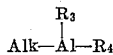

wherein R$_3$ and R$_4$ are primary alkyl radicals having 6 to 30 carbon atoms and Alk is a primary alkyl radical having 2 to 30 carbon atoms which comprises reacting an olefin having the formula

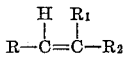

wherein R and R$_1$ are alkyl radicals and R$_2$ is selected from the group consisting of hydrogen and alkyl radicals and the sum of the carbon atoms in R, R$_1$ and R$_2$ is between 4 and 28 with an aluminum alkyl having a formula selected from the group consisting of

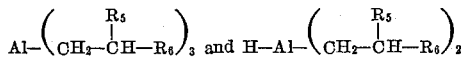

wherein each of R$_5$ and R$_6$ represents a member selected from the group consisting of hydrogen and alkyl radicals and wherein R$_5$ and R$_6$ together with the

to which they are connected may also represent a cycloalkyl radical, the sum of the carbon atoms in R$_5$ and R$_6$ is between 0 and 6, at 100 to 150° C. while removing α-olefins formed to form an aluminum hydride having the formula

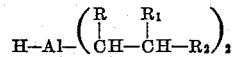

wherein R, R$_1$ and R$_2$ have the above definitions, reacting said di-secondary alkyl aluminum hydride with an α-olefin having 2 to 30 carbon atoms at temperatures below 150° C. to form a compound having the formula

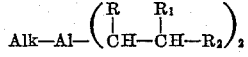

wherein Alk, R, R$_1$ and R$_2$ have the above definitions, isomerizing said aluminum trialkyl at temperatures between 150° C. and 250° C. in the presence of more equimolar amounts of an olefin having 6 to 30 carbon atoms to form aluminum tri-primary alkyl compounds and recovering said aluminum tri-primary alkyl compounds.

5. The process of claim 4 wherein R$_2$ is hydrogen.
6. The process of claim 4 wherein the isomerization temperature is between 180° to 220° C.

References Cited by the Examiner

UNITED STATES PATENTS

| | | |
|---|---|---|
| 2,863,895 | 12/1958 | Kirshenbaum et al. |
| 2,892,858 | 6/1959 | Ziegler. |
| 2,906,763 | 9/1959 | McKinnis. |
| 2,921,949 | 1/1960 | Kirshenbaum et al. |
| 2,959,607 | 11/1960 | Werber. |
| 3,015,669 | 1/1962 | Ziegler et al. |
| 3,100,786 | 8/1963 | Fernald. |

FOREIGN PATENTS 1,179,056   5/1959   France.

OTHER REFERENCES

Justus Leibigs Annalen Der Chemie, March 1960, p. 210.

Abstract No. SOV/62—58-10-21/25 (in English) of article by Zakharkin et al. in Izvestiya Akad. nauk SSR (1958), p. 1278 (abstract on 2 cards).

TOBIAS E. LEVOW, *Primary Examiner.*